United States Patent
Parrish

(10) Patent No.: US 6,387,004 B1
(45) Date of Patent: May 14, 2002

(54) CONTINUOUSLY VARIABLE TRANSMISSION

(75) Inventor: Brian E. Parrish, Garden Grove, CA (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/560,063

(22) Filed: Apr. 27, 2000

Related U.S. Application Data

(60) Provisional application No. 60/132,032, filed on Apr. 30, 1999.

(51) Int. Cl.$^7$ ................................................. F16H 3/72
(52) U.S. Cl. ............................................................ 475/5
(58) Field of Search ................................ 475/5, 7, 269

(56) References Cited

U.S. PATENT DOCUMENTS

| | | | | |
|---|---|---|---|---|
| 5,387,161 A | * | 2/1995 | Shibahata | ........................ 475/5 |
| 5,417,298 A | * | 5/1995 | Shibahata | ............. 74/665 T X |
| 5,571,058 A | * | 11/1996 | Schmidt | ........................ 475/5 |
| 5,577,973 A | * | 11/1996 | Schmidt | ........................ 475/5 |
| 5,730,675 A | * | 3/1998 | Yamaguchi | ................ 475/5 X |
| 5,931,757 A | * | 8/1999 | Schmidt | .................... 475/5 X |
| 6,053,833 A | * | 4/2000 | Masaki | ...................... 475/5 X |
| 6,234,930 B1 | * | 5/2001 | Kaneko et al. | ................ 475/5 |

OTHER PUBLICATIONS

A SAE publication entitled "Development of a New Hybrid System—Dual System" by Yamaguchi et al., and believed to have been published in 1996.

* cited by examiner

Primary Examiner—Charles A Marmor
Assistant Examiner—Roger Pang
(74) Attorney, Agent, or Firm—Tarolli, Sundheim, Covell, Tummino & Szabo L.L.P.

(57) ABSTRACT

A continuously variable transmission (10) comprises first and second planetary gear sets (20 and 30). Each of the first and second planetary gear sets (20 and 30) includes a sun gear member (22, 32), a ring gear member (24, 34), at least one planet gear (26, 36) meshing with the sun gear member and with the ring gear member, and a planet gear carrier member (28, 38). The at least one planet gear (26, 36) is rotatably mounted to the planet gear carrier member (28, 38). A first drive (40) drivingly connects a first one (22) of the members of the first planetary gear set (20) and a first one (32) of the members of the second planetary gear set (30). A second drive (50) drivingly connects a second one (24) of the members of the first planetary gear set (20) and a second one (34) of the members of the second planetary gear set (30). A third drive (60) is drivingly connected with a third one (28) of the members of the first planetary gear set (20). A fourth drive (70) is drivingly connected with a third one (38) of the members of the second planetary gear set (30).

17 Claims, 6 Drawing Sheets

CONTINUOUSLY VARIABLE TRANSMISSION

RELATED APPLICATION

This application claims priority from U.S. Provisional patent application Ser. No. 60/132,032, filed Apr. 30, 1999, entitled "Epicyclic Continuously Variable Transmission".

TECHNICAL FIELD

The present invention is directed to a continuously variable transmission and, in addition, is also directed to an apparatus having a continuously variable transmission.

BACKGROUND AND SUMMARY OF THE INVENTION

When choosing a power source for a particular application, the ideal choice would produce power with peak efficiency at exactly the torque and angular velocity required. Since this is impractical, a mechanical transmission is typically used with a power source to provide the appropriate torque and angular velocity required. Power is given by the following equation:

Power=Torque*Angular Velocity

In a mechanical transmission, a governing equation is:

$Power_{In} = Power_{Out} + Power\ Loss$

Rewriting this equation in terms of torque and angular velocity provides:

$Torque_{In} * Angular\ Velocity_{In} = (Torque_{Out} * Angular\ Velocity_{Out}) + Power\ Loss$ In the case of an automobile, the required output conditions, angular velocity and torque, are always changing. Finding an engine capable of changing to match the output conditions is extremely difficult. An automobile typically uses an internal combustion engine as a power source while the driver controls the desired output condition. This application requires widely varied torque and angular velocities at the output depending on the driving condition. An internal combustion engine is simply not able to provide all of the varied torque and angular velocities while maintaining a high efficiency.

Vehicle designers overcame this limitation by using a manual transmission with several gear ratios. The vehicle driver manually changes the gear ratio to suit the driving environment. Around 1950, the automatic transmission was employed in vehicles to make the gear ratio changes automatically, but still incrementally. Neither the manual transmission nor the automatic transmission attempts to maintain the engine performance at an optimum level. Rather, these transmissions cause the engine to operate around its optimum level during each gear. This leads to an engine design that must have an extensive range of acceptable operating conditions. The engine is required to have reasonable power output over a fairly wide range of angular velocity conditions.

This requirement typically forces the engine to be less efficient than otherwise might be obtainable because an engine with a very narrow band of operation can more easily be optimized. It is conceivable to have an engine with peak power, torque, and efficiency all occurring at the same angular velocity. If these parameters decline sharply as the engine operates at points other than the optimum, the transmission would need many gear ratios to couple the engine to the desired output condition.

In order to use such an optimized engine, a continuously variable transmission (CVT) is employed. The CVT allows the engine to operate at its optimum while the vehicle operates at a widely varied set of driving conditions. To accomplish this, an infinite number of gear ratios are available between the input and output shafts of the transmission. By continuously varying from one gear ratio to another slightly different gear ratio, the CVT optimally couples the desired engine performance to the desired vehicle performance.

In optimizing a vehicle, it is realized that at certain vehicle operating conditions the peak power of an engine is greater than the power the vehicle can use. For example, a car at rest can be accelerated by the application of a torque; however, the total power that it can handle at zero velocity is zero. This is because power equals torque multiplied by angular velocity. When the angular velocity is zero, so is the power. An engine running at its optimal point would still produce power at zero angular velocity, leaving excess power. In a conventional car, such excess power is unacceptable because it cannot be used.

A hybrid vehicle, which is a cross between an electric car and a traditional car, makes efficient use of excess power by generating electricity from the engine power and storing this energy in a battery. Later, this stored energy can be used when required rather than asking for more power from the engine. An electric motor, powered by the vehicle battery, provides the propulsion force in a series hybrid vehicle. A parallel hybrid vehicle uses both the internal combustion engine as well as an electric motor to drive the vehicle. In a parallel hybrid, both power sources (the engine and the electric motor) have transmission paths to drive wheels of the vehicle.

A hybrid vehicle can operate at very high efficiency for several reasons. Electric motors typically have much higher efficiencies than an internal combustion engine, and electric motors typically have a broader range of efficient operating conditions. In addition, the series hybrid vehicle allows the engine to be set up to operate only at its peak performance point.

The design of parallel hybrid vehicles is somewhat limited by the transmission options. The engine still requires a multi-gear transmission to get the operation in the neighborhood of the vehicle requirements. At 20 miles per hour with the engine at peak output, the gear ratio is quite different than at 60 miles per hour with the engine at the same condition. A continuously variable transmission solves these gearing issues.

A CVT can be used with an impulse drive. However, an impulse drive is impractical for automotive applications due to the discontinuous output speed, which leads to pulsating power.

Several different concepts for a non-pulsating CVT have been designed. The most common is a belt-pulley system where the two pulleys are split axially into two halves. At least one half of each pulley can slide along the axis of rotation. A belt is set on the pulleys and by moving one pulley half closer to the stationary pulley half, the belt is forced away from the axis of rotation. The second pulley in the system does the exact opposite by moving the pulley half away from the stationary pulley half thereby causing the belt to move closer to the axis of rotation. The location of the belt on the driving pulley relative to the location on the driven pulley determines the gear ration. Visually, this is similar to a bicycle chain drive. As the chain moves to the larger sprocket at the pedals, the input to output gear ratio decreases. Moving the chain to the smaller sprocket at the wheel also causes the gear ratio to decrease. One disadvantage of the belt-pulley system is that there is a high friction load at the belt-pulley interface. The belt must have enough friction at the pulley to transmit the force required to move the vehicle; however, it also must have a low enough friction to slide easily up and down the faces of the pulley. These are contradictory requirements.

A variant on the belt-pulley concept has been designed which employs radial grooves on the two pulleys. The belt has sheaves that slide laterally within the belt to engage the grooves. This gives a positive drive and reduced radial sliding friction, but also generates friction inside the belt by sliding the sheaves back and forth.

Other known techniques employ balls or wheels with a tilting axis of rotation to couple a driving wheel to a driven wheel at varying points. Still other known techniques use a set of cones and a sliding ring or wheel or ball to couple the cone sets.

In all of the aforementioned non-pulsating CVT systems, a sliding element is employed within the power path of the transmission. This design tends to lead to contradictory requirements of adequate power transfer and minimal power to change gears. In addition, the sliding elements consume power as they are loaded and unloaded even when the gear ratios are not changing. Ideally, a CVT would continuously vary the gear ratio and require no power to do so. Also, an ideal CVT would not consume power just to maintain a constant operating gear ratio.

Thus, it is desirable to have a continuously variable transmission that couples the input power source to the output application without the use of sliding friction elements such as belts and wheels.

The present invention is a continuously variable transmission comprising first and second planetary gear sets. Each of the first and second planetary gear sets includes a sun gear member, a ring gear member, at least one planet gear meshing with the sun gear member and with the ring gear member, and a planet gear carrier member. The at least one planet gear is rotatably mounted to the planet gear carrier member. A first drive drivingly connects a first one of the members of the first planetary gear set and a first one of the members of the second planetary gear set. A second drive drivingly connects a second one of the members of the first planetary gear set and a second one of the members of the second planetary gear set. A third drive is drivingly connected with a third one of the members of the first planetary gear set. A fourth drive is drivingly connected with a third one of the members of the second planetary gear set.

In accordance with a preferred embodiment of the present invention, a first one of the drives is associated with a power input device, a second one of the drives is associated with a power output device, and a third one of the drives is associated with an additional power device. The first and second planetary gear sets define a torque loop for transmitting power from at least one of the power input device and the additional power device to the power output device.

The present invention also provides an apparatus comprising first and second planetary gear sets. Each of the first and second planetary gear sets includes a sun gear member, a ring gear member, at least one planet gear meshing with the sun gear member and with the ring gear member, and a planet gear carrier member. The at least one planet gear is rotatably mounted to the planet gear carrier member. A first drive drivingly connects a first one of the members of the first planetary gear set and a first one of the members of the second planetary gear set. A second drive drivingly connects a second one of the members of the first planetary gear set and a second one of the members of the second planetary gear set. A third drive is drivingly connected with a third one of the members of the first planetary gear set. A fourth drive is drivingly connected with a third one of the members of the second planetary gear set. A power input device is associated with a first one of the drives. A power output device is associated with a second one of the drives. At least one additional power device is associated with a third one of the drives.

In accordance with one embodiment of the invention, the power input device comprises an internal combustion engine, the power output device comprises a driven device, and the additional power device comprises an electric machine, whereby the first and second planetary gear sets define a continuously variable transmission for a hybrid vehicle. The electric machine comprises an electric motor/generator which is capable of either supplying or removing power from the continuously variable transmission.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENTS

The present invention is directed to a continuously variable transmission and, in addition, to an apparatus utilizing a continuously variable transmission. The present invention may be practiced in a number of different configurations, and is adaptable to a variety of different applications. As representative of the present invention, FIG. 1 schematically illustrates a continuously variable transmission (CVT) 10 constructed in accordance with a first embodiment of the present invention.

Figure 2:
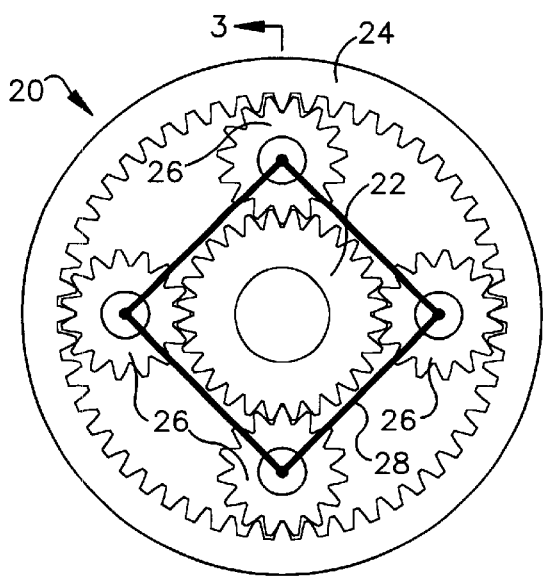
FIG. 2 is a schematic end view of a component of the continuously variable transmission of FIG. 1.
Figure 3:
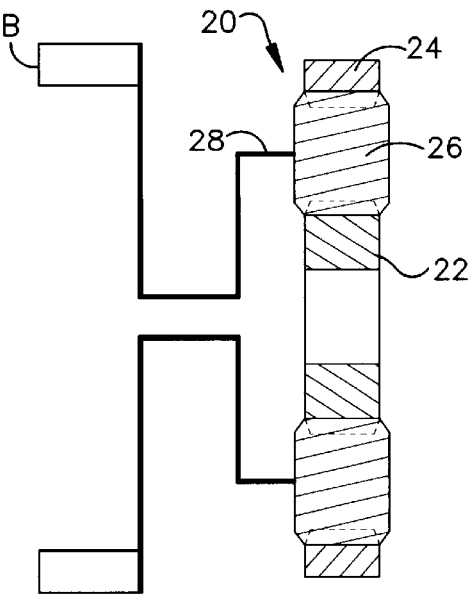
FIG. 3 is a schematic sectional view taken along line 3—3 in FIG. 2.

The CVT 10 comprises first and second planetary gear sets 20 and 30, respectively, of generally known construction. As shown in FIGS. 2 and 3, the first planetary gear set 20 includes a sun gear 22, a ring gear 24 encircling the sun gear, one or more planetary gears 26 disposed between the sun gear and the ring gear, and a planetary gear carrier 28. As is known in the art, the planetary gears 26 are rotatably mounted to the planet gear carrier 28. Further, the planetary gears 26 have teeth which are meshed with teeth on the sun gear 22 and with teeth on the ring gear 24. The number of teeth on each of the gears 22–26 is a matter of design choice depending on desired output ratio and component strength.

The second planetary gear 30 set is similar in construction to the first planetary gear set 20. The second planetary gear set 30 includes a sun gear 32, a ring gear 34, one or more planetary gears 36, and a planetary gear carrier 38. Depending on the desired gear ratios, the gears 32–36 in the second planetary gear 30 set may be identical in size and configuration to the gears 22–26 in the first planetary gear set 20 or, alternatively, they may differ in size and configuration from the gears in the first planetary gear set.

Figure 1:
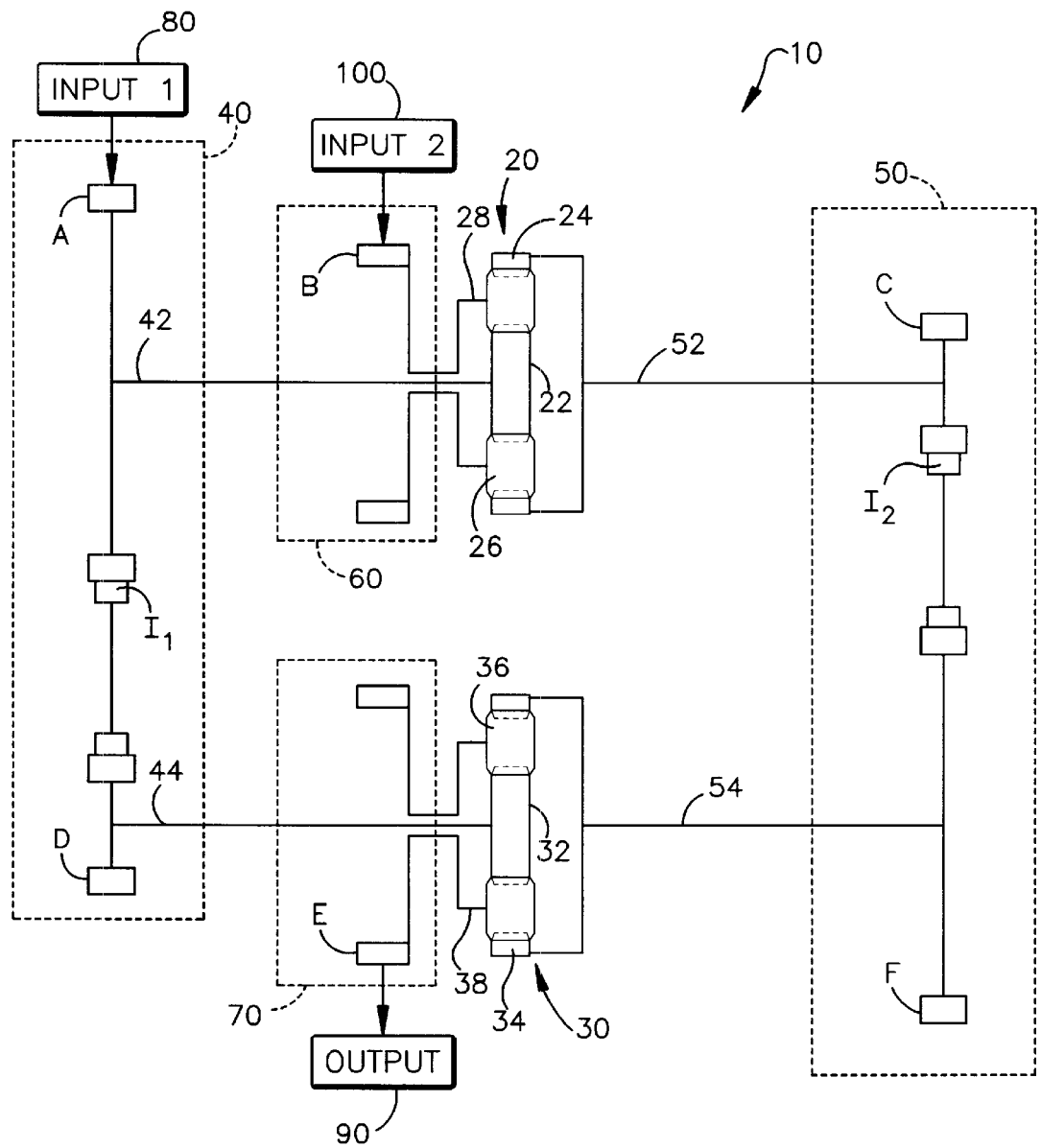
FIG. 1 is a schematic diagram of a continuously variable transmission constructed in accordance with a first embodiment of the present invention.

In accordance with the first embodiment of the invention illustrated in FIG. 1, the CVT 10 includes a first drive mechanism 40 for drivingly connecting the sun gear 22 of the first planetary gear 20 set with the sun gear 32 of the second planetary gear set 30. The first drive mechanism 40 comprises a first gear A, a second gear D, and a first idler gear I1. Thus, the first and second gears A and D rotate in the same direction. The first gear A and the second gear D are drivingly coupled by the first idler gear I1. A first shaft 42, shown only schematically in FIG. 1, drivingly connects the first gear A with the sun gear 22 of the first planetary gear set 20. A second shaft 44 drivingly connects the second gear D with the sun gear 32 of the second planetary gear set 30.

The CVT 10 further includes a second drive mechanism 50 for drivingly connecting the ring gear 24 of the first planetary gear set 20 with the ring gear 34 of the second planetary gear set 30. The second drive mechanism 50 comprises a third gear C, a fourth gear F, and a second idler gear I2. The third gear C and the fourth gear F are drivingly coupled by the second idler gear I2. Thus, the third and fourth gears C and F rotate in the same direction. A third shaft 52, shown only schematically in FIG. 1, drivingly connects the third gear C with the ring gear 24 of the first planetary gear set 20. A fourth shaft drivingly connects the fourth gear F with the ring gear 34 of the second planetary gear set 30.

The CVT 10 also includes a third drive mechanism 60 and a fourth drive mechanism 70. The third drive mechanism 60 is drivingly connected with the planetary gear carrier 28 of the first planetary gear set 20. The third drive mechanism 60 includes a fifth gear B. The fourth drive mechanism 70 is drivingly connected with the planetary gear carrier 38 of the second planetary gear set 30. The fourth drive mechanism 70 includes a sixth gear E.

Figure 4:
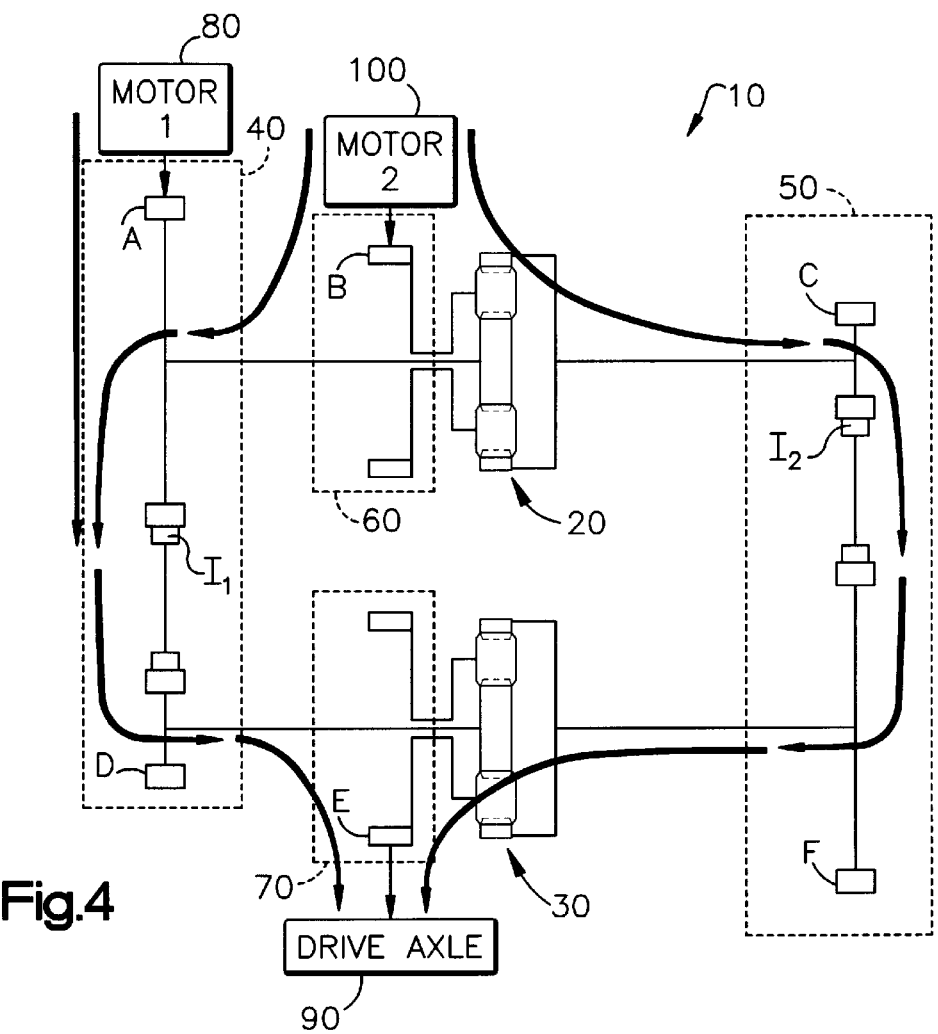
FIG. 4 is a schematic diagram similar to FIG. 1 illustrating the torque flow through the continuously variable transmission of FIG. 1.

In further accordance with the first embodiment of the present invention, a first power input device 80 is operatively coupled with gear A, while a power output device 90 is operatively coupled with gear E. Further, an additional power device 100 is operatively coupled with gear B. The two planetary gears sets 20 and 30 together with the four drive mechanisms 40, 50, 60, and 70 define a torque loop through the CVT 10 for transmitting torque from either or both of the devices 80 and 100 at gears A and B, respectively, to the power output device 90 at gear E as illustrated by the arrows in FIG. 4.

Once the gear sizes, and thus the gear ratios, for each of the planetary gear sets 20 and 30 are chosen, the power device 100 then sets the overall gear ratio for the CVT 10 by acting as either a motor or a generator depending on the desired output conditions. The relative angular velocities of the power input device 80 and the power device 100 determine the angular velocity of the output device 90. Thus, by establishing a desired output torque at gear E, the torque required from one or both of the power input device 80 and the power device 100 is determined.

For example, if the power input device 80 at gear A is set to operate at a peak efficiency point and the output torque at gear E is the controllable variable, then the power device 100 at gear B functions to either contribute additional power or remove excess power depending on the torque desired. When the desired output power at gear E is less than the power being contributed by the power input device 80 at gear A, the power device 100 dissipates the excess power as waste heat or by charging a battery (not shown in FIG. 1). Conversely, when the desired output power at gear E exceeds the power available from the power input device 80 at gear A, the power device 100 at gear B provides the additional power required to meet the desired power at gear E. It should be understood that the direction of rotation of gear B by the power device 100 changes when the power device begins providing power instead of removing power. Further, at the transition point between the providing power and removing power, the power device 100 can stall.

Figure 5:
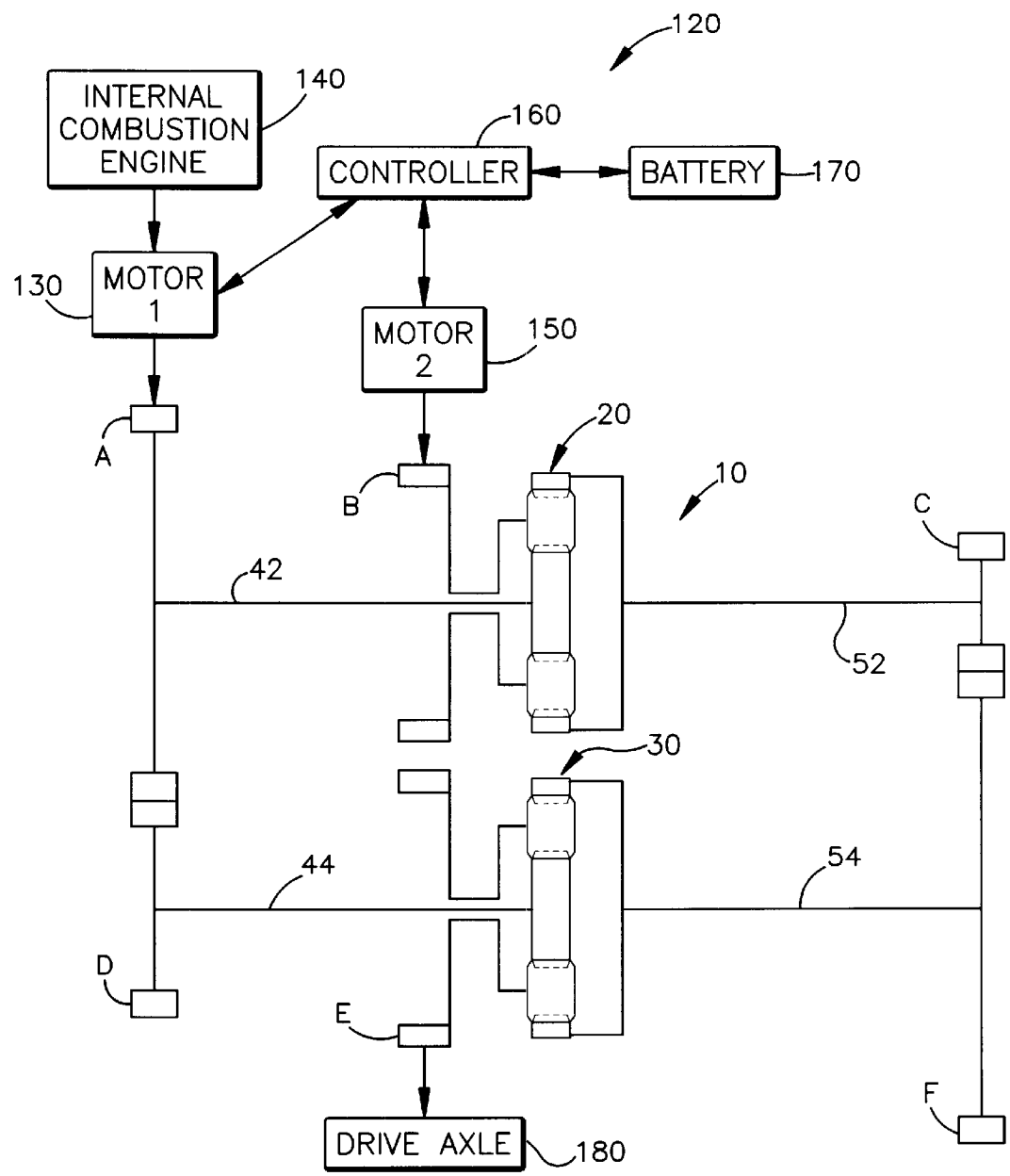
FIG. 5 is a schematic diagram of an apparatus having a continuously variable transmission.

FIG. 5 illustrates a preferred embodiment in which the CVT 10 is utilized in a hybrid vehicle 120. The center distance between the first and second planetary gear sets 20 and 30 is held constant so that the first and second idler gears I1 and I2 shown in FIG. 1 are eliminated. Hence, in the preferred embodiment, gear A meshes directly with gear D, and gear C meshes directly with gear F. Obviously, the direct connection of gears A and D and of gears C and F means that the sun gear 32 and the ring gear 34 in the second planetary gear set 30 rotate in the opposite direction from the direction in which these gears rotate in the embodiment of FIG. 1.

In the hybrid vehicle 120 of FIG. 5, a first electric motor 130 is placed in series with an internal combustion engine 140 at gear A. A second electric motor, or control motor 150, is located at gear B. The electric motor 130 and the control motor 150 are operatively coupled with a controller 160. The controller 160 is electrically connected to a battery 170. Finally, gear E is coupled with a drive axle 180 of the vehicle.

The series arrangement of the electric motor 130 and the internal combustion engine 140 prevents the control motor 150 from stalling at cruise speeds for the vehicle. Stalling of the control motor 150 is prevented by removing power from the internal combustion engine 140 using the electric motor 130, and sending this power to the control motor 150, via the controller 160 and the battery 170, for reinsertion into the CVT 10. The electric motor 130 acts like a generator to remove the power and store the power by charging the battery 170. The battery 170 then powers the control motor 150 with the stored power from the electric motor 130 and keeps the control motor running continuously. It should be noted that the electric motor 130 and the control motor 150 should be selected so that, at all times, each of the motors provides both torque and angular velocity into the CVT 10.

Similarly, at low vehicle speeds, the internal combustion engine 140, which is set to run at peak efficiency, drives gear A via the electric motor 130. Excess power from the engine 140 is used to charge the battery 170 as described above. The control motor 130, using the power from the battery 170, is rotated in a backwards or opposite direction which provides resistance in the CVT 10 to achieve the desired slow angular velocity and low torque at gear E. Conversely, at high vehicle speeds or under hard acceleration, both the engine 140 and the control motor 90 contribute power to the CVT 10 to achieve the desired output at gear E. Obviously, high speeds cannot be sustained too long or the battery 170 will drain below the power level needed to keep the control motor 150 energized at a high output level.

Figure 6:
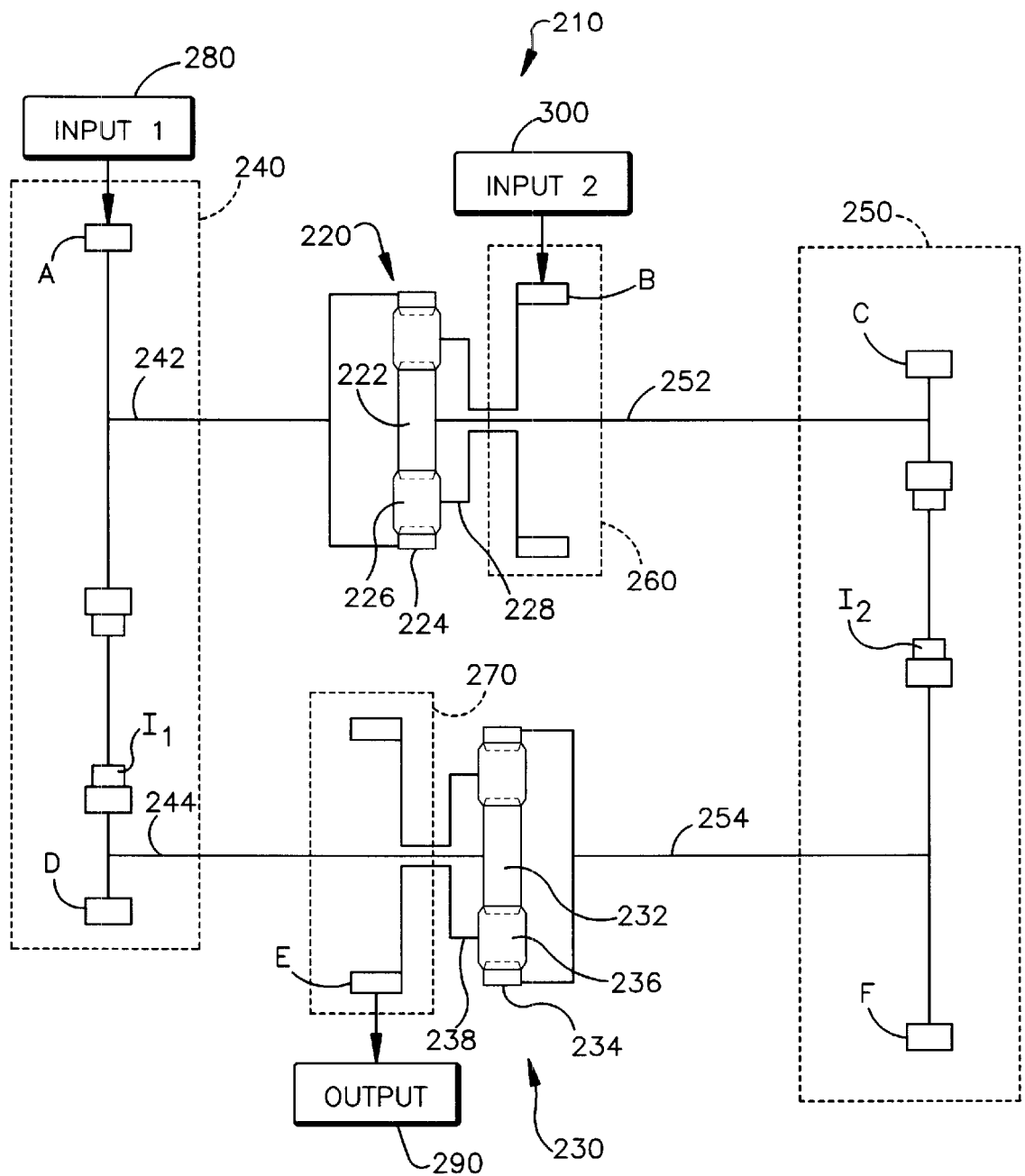
FIG. 6 is a schematic diagram of a continuously variable transmission constructed in accordance with a second embodiment of the present invention.
Figure 7:
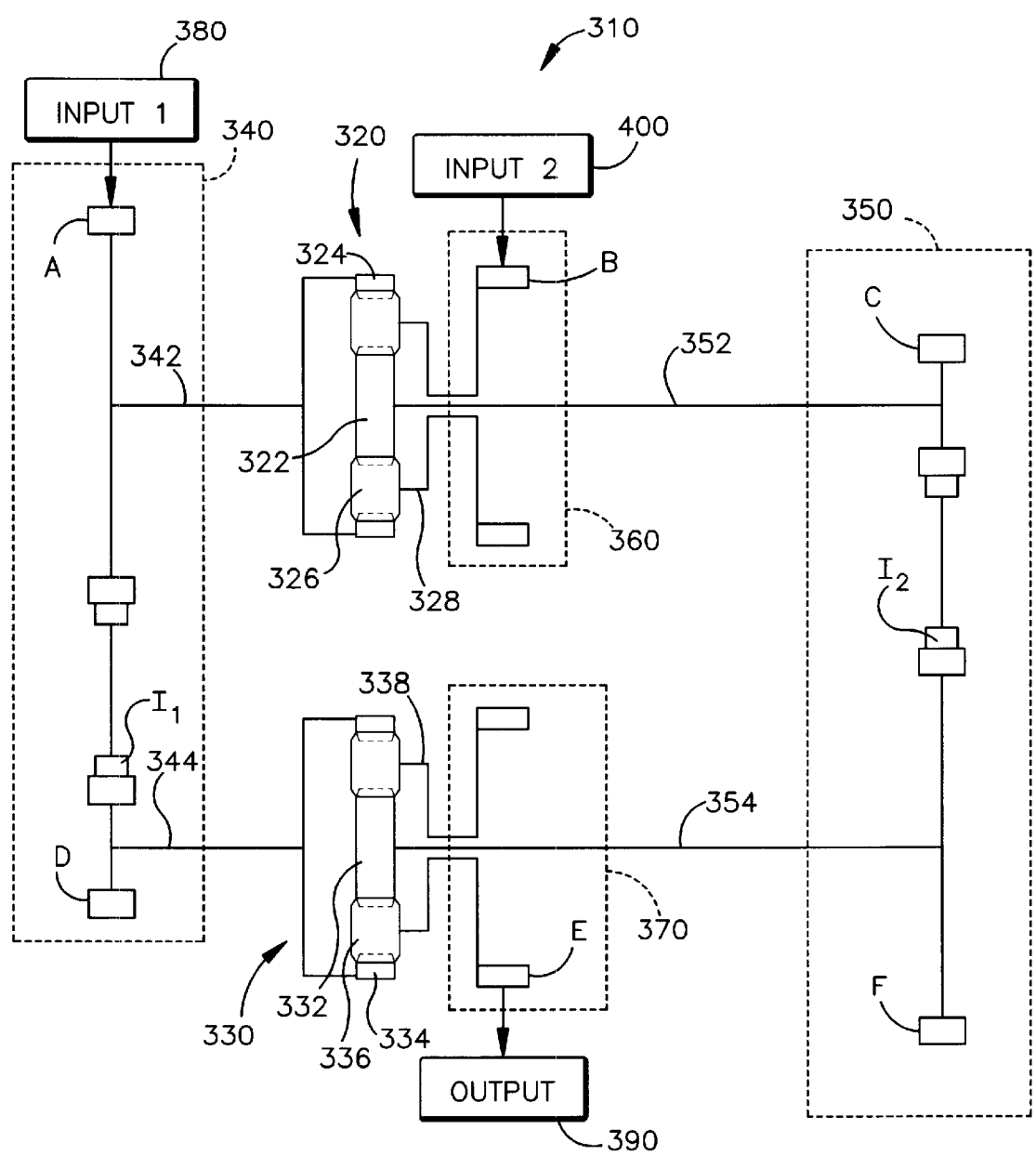
FIG. 7 is a schematic diagram of a continuously variable transmission constructed in accordance with a third embodiment of the present invention.
Figure 8:
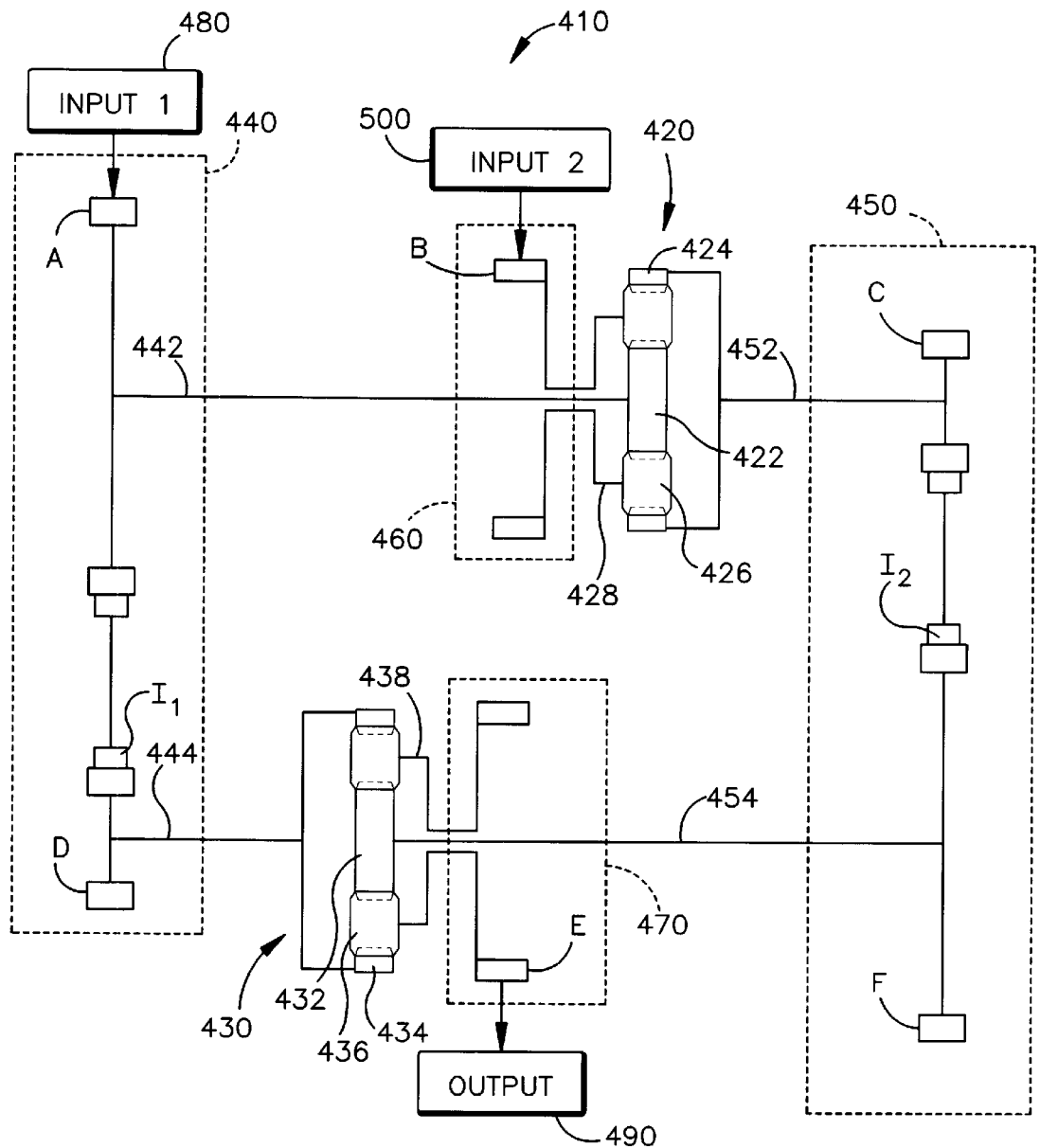
FIG. 8 is a schematic diagram of a continuously variable transmission constructed in accordance with a fourth embodiment of the present invention.

FIGS. 6–8 illustrate just a few of the possible alternate configurations of the present invention. FIG. 6 schematically shows a CVT 210 constructed in accordance with a second embodiment. The CVT 210 comprises first and second planetary gear sets 220 and 230. The first planetary gear set 220 includes a sun gear 222, a ring gear 224, one or more planetary gears 226, and a planetary gear carrier 228. The second planetary gear set 230 includes a sun gear 232, a ring gear 234, one or more planetary gears 236, and a planetary gear 238 carrier.

In accordance with the second embodiment of the invention illustrated in FIG. 6, the CVT 210 includes a first drive mechanism 240 for drivingly connecting the ring gear 224 of the first planetary gear set 220 with the sun gear 232 of the second planetary gear set 230. The first drive mechanism 240 comprises a first gear A, a second gear D, and a first idler gear I1. The first gear A and the second gear D are drivingly coupled by the first idler gear I1. A first shaft 242 drivingly connects the first gear A with the ring gear 224 of the first planetary gear set 220. A second shaft 244 drivingly connects the second gear D with the sun gear 232 of the second planetary gear set 230.

The CVT 210 further includes a second drive mechanism 250 for drivingly connecting the sun gear 222 of the first planetary gear set 220 with the ring gear 234 of the second planetary gear set 230. The second drive mechanism 250 comprises a third gear C, a fourth gear F, and a second idler gear I2. The third gear C and the fourth gear F are drivingly coupled by the second idler gear I2. A third shaft 252 drivingly connects the third gear C with the sun gear 222 of the first planetary gear set 220. A fourth shaft 254 drivingly connects the fourth gear F with the ring gear 234 of the second planetary gear set 230.

As with the first embodiment of FIG. 1, the CVT 210 also includes a third drive mechanism 260 and a fourth drive mechanism 270. The third drive mechanism 260 is drivingly connected with the planetary gear carrier 228 of the first planetary gear set 220. The third drive mechanism 260 comprises a fifth gear B. The fourth drive mechanism 270 is drivingly connected with the planetary gear carrier 238 of the second planetary gear set 230. The fourth-drive mechanism 270 comprises a sixth gear E.

The CVT 210 according to the embodiment of FIG. 6 functions similarly to the CVT 10 of FIG. 1 but, by virtue of the different gear arrangement, provides a different overall gear ratio for the CVT.

FIG. 7 schematically shows a CVT 310 constructed in accordance with a third embodiment. The CVT 310 comprises first and second planetary gear sets 320 and 330. The first planetary gear set 320 includes a sun gear 322, a ring gear 324, one or more planetary gears 326, and a planetary gear carrier 328. The second planetary gear set 330 includes a sun gear 332, a ring gear 334, one or more planetary gears 336, and a planetary gear carrier 338.

In accordance with the third embodiment, the CVT 310 includes a first drive mechanism 340 for drivingly connecting the ring gear 324 of the first planetary gear set 320 with the ring gear 334 of the second planetary gear set 330. The first drive mechanism 340 comprises a first gear A, a second gear D, and a first idler gear I1. The first gear A and the second gear D are drivingly coupled by the first idler gear I1. A first shaft 342 drivingly connects the first gear A with the ring gear 324 of the first planetary gear set 320. A second shaft 344 drivingly connects the second gear D with the ring gear 334 of the second planetary gear set 330.

The CVT 310 further includes a second drive mechanism 350 for drivingly connecting the sun gear 322 of the first planetary gear set 320 with the sun gear 332 of the second planetary gear set 330. The second drive mechanism 350 comprises a third gear C, a fourth gear F, and a second idler gear I2. The third gear C and the fourth gear F are drivingly coupled by the second idler gear I2. A third shaft 352 drivingly connects the third gear C with the sun gear 322 of the first planetary gear set 320. A fourth shaft 354 drivingly connects the fourth gear F with the sun gear 332 of the second planetary gear set 330.

As with the first embodiment of FIG. 1, the CVT 310 also includes a third drive mechanism 360 and a fourth drive mechanism 370. The third drive mechanism 360 is drivingly connected with the planetary gear carrier 328 of the first planetary gear set 320. The third drive mechanism 360 comprises a fifth gear B. The fourth drive mechanism 370 is drivingly connected with the planetary gear carrier 338 of the second planetary gear set 330. The fourth drive mechanism 370 comprises a sixth gear E.

The CVT 310 according to the embodiment of FIG. 7 functions similarly to the CVT of FIG. 1 but, by virtue of the different gear arrangement, provides a different overall gear ratio for the CVT.

FIG. 8 schematically shows a CVT 410 constructed in accordance with a fourth embodiment. The CVT 410 comprises first and second planetary gear sets 420 and 430. The first planetary gear set 420 includes a sun gear 422, a ring gear 424, one or more planetary gears 426, and a planetary gear carrier 428. The second planetary gear set 430 includes a sun gear 432, a ring gear 434, one or more planetary gears 436, and a planetary gear carrier 438.

In accordance with the second embodiment of the invention illustrated in FIG. 8, the CVT 410 includes a first drive mechanism 440 for drivingly connecting the sun gear 422 of the first planetary gear set 420 with the ring gear 434 of the second planetary gear set 430. The first drive mechanism 440 comprises a first gear A, a second gear D, and a first idler gear I1. The first gear A and the second gear D are drivingly coupled by the first idler gear I1. A first shaft 442 drivingly connects the first gear A with the sun gear 422 of the first planetary gear set 420. A second shaft 444 drivingly connects the second gear D with the ring gear 434 of the second planetary gear set 430.

The CVT 410 further includes a second drive mechanism 450 for drivingly connecting the ring gear 424 of the first planetary gear set 420 with the sun gear 432 of the second planetary gear set 430. The second drive mechanism 450 comprises a third gear C, a fourth gear F, and a second idler gear I2. The third gear C and the fourth gear F are drivingly coupled by the second idler gear I2. A third shaft 452 drivingly connects the third gear C with the ring gear 424 of the first planetary gear set 420. A fourth shaft 454 drivingly connects the fourth gear F with the sun gear 432 of the second planetary gear set 430.

As with the first embodiment of FIG. 1, the CVT 410 also includes a third drive mechanism 460 and a fourth drive mechanism 470. The third drive mechanism 460 is drivingly connected with the planetary gear carrier 428 of the first planetary gear set 420. The third drive mechanism 460 comprises a fifth gear B. The fourth drive mechanism 470 is drivingly connected with the planetary gear carrier 436 of the second planetary gear set 430. The fourth drive mechanism 430 comprises a sixth gear E.

The CVT 410 according to the embodiment of FIG. 8 functions similarly to the CVT of FIG. 1 but, by virtue of the different gear arrangement, provides a different overall gear ratio for the CVT.

The present invention disclosed herein provides a highly flexible design which can be reconfigured according to the operating range of various vehicles, engines, and motors. It is contemplated that the present invention could be used in some type machine other than an automobile, including a machine for dynamic testing of gears. The disclosed CVT designs do not utilize sliding friction elements, and thus eliminate power loss resulting from such friction.

A nearly infinite number of gear ratios are possible according to the present invention. Reversing the orientation of one of the planetary gears as illustrated by the embodiments of FIGS. 6–8 is one way to change the overall gear ratio. Certainly, changing gear sizes is another way.

The highly flexible nature of the present invention is also realized by the ability to place power input devices and/or power output devices at any of the gears A–F in order to achieve a particular power output. The Figures indicate only one such possibility, but are not intended to be inclusive of all such possibilities. For example, depending on the particular application, power input devices could be placed at gears C, D, and E, while a power output device is located at gear B.

From the above description of the invention, those skilled in the art will perceive improvements, changes and modifications. Such improvements, changes and modifications within the skill of the art are intended to be covered by the appended claims.

Having described the invention, I claim:

1. A continuously variable transmission comprising:
   first and second planetary gear sets, each of said first and second planetary gear sets including a sun gear member, a ring gear member, at least one planet gear meshing with said sun gear member and with said ring gear member, and a planet gear carrier member, said at least one planet gear being rotatably mounted to said planet gear carrier member;
   a first drive for drivingly connecting a first one of said members of said first planetary gear set and a first one of said members of said second planetary gear set;
   a second drive for drivingly connecting a second one of said members of said first planetary gear set and a second one of said members of said second planetary gear set;
   a third drive drivingly connected with a third one of said members of said first planetary gear set; and
   a fourth drive drivingly connected with a third one of said members of said second planetary gear set;
      wherein said first drive comprises first and second gears, said first gear being fixed for rotation with said first one of said members of said first planetary gear set relative to said second gear, said second gear being fixed for rotation with said first one of said members of said second planetary gear set relative to said first gear.

2. The continuously variable transmission of claim 1 wherein said first gear is meshed with said second gear.

3. The continuously variable transmission of claim 2 wherein said first gear is drivingly coupled with said second gear by a first idler gear.

4. The continuously variable transmission of claim 1 wherein said second drive comprises third and fourth gears, said third gear being drivingly connected with said second one of said members of said first planetary gear set, said fourth gear being drivingly connected with said second one of said members of said second planetary gear set.

5. A continuously variable transmission comprising:
   first and second planetary gear sets, each of said first and second planetary gear sets including a sun gear member, a ring gear member, at least one planet gear meshing with said sun gear member and with said ring gear member, and a planet gear carrier member, said at least one planet gear being rotatably mounted to said planet gear carrier member;
   a first drive for drivingly connecting a first one of said members of said first planetary gear set and a first one of said members of said second planetary gear set;
   a second drive for drivingly connecting a second one of said members of said first planetary gear set and a second one of said members of said second planetary gear set;
   a third drive drivingly connected with a third one of said members of said first planetary gear set; and
   a fourth drive drivingly connected with a third one of said members of said second planetary gear set;
      wherein said first drive comprises first and second gears, said first gear being drivingly connected with said first one of said members of said first planetary gear set, said second gear being drivingly connected with said first one of said members of said second planetary gear set;
      wherein said second drive comprises third and fourth gears, said third gear being drivingly connected with said second one of said members of said first planetary gear set, said fourth gear being drivingly connected with said second one of said members of said second planetary gear set; and
      wherein said third gear is meshed with said fourth gear.

6. A continuously variable transmission comprising:
   first and second planetary gear sets, each of said first and second planetary gear sets including a sun gear member, a ring gear member, at least one planet gear meshing with said sun gear member and with said ring gear member, and a planet gear carrier member, said at least one planet gear being rotatably mounted to said planet gear carrier member;
   a first drive for drivingly connecting a first one of said members of said first planetary gear set and a first one of said members of said second planetary gear set;
   a second drive for drivingly connecting a second one of said members of said first planetary gear set and a second one of said members of said second planetary gear set;
   a third drive drivingly connected with a third one of said members of said first planetary gear set; and
   a fourth drive drivingly connected with a third one of said members of said second planetary gear set;
      wherein said first one of said members of said first planetary gear comprises a sun gear and said first one of said members of said second planetary gear comprises a sun gear; and
      wherein said second one of said members of said first planetary gear comprises a ring gear and said second one of said members of said second planetary gear comprises a ring gear.

7. A continuously variable transmission comprising:
   first and second planetary gear sets, each of said first and second planetary gear sets including a sun gear member, a ring gear member, at least one planet gear meshing with said sun gear member and with said ring gear member, and a planet gear carrier member, said at least one planet gear being rotatably mounted to said planet gear carrier member;

a first drive for drivingly connecting a first one of said members of said first planetary gear set and a first one of said members of said second planetary gear set;

a second drive for drivingly connecting a second one of said members of said first planetary gear set and a second one of said members of said second planetary gear set;

a third drive drivingly connected with a third one of said members of said first planetary gear set; and a fourth drive drivingly connected with a third one of said members of said second planetary gear set;

wherein said third one of said members of said first planetary gear comprises a planet gear carrier and said third one of said members of said second planetary gear comprises a planet gear carrier.

8. The continuously variable transmission of claim 7 wherein said second drive comprises third and fourth gears, said third gear being drivingly connected with said second one of said members of said first planetary gear set, said fourth gear being drivingly connected with said second one of said members of said second planetary gear set, and wherein said third gear in drivingly coupled with said fourth gear by a second idler gear.

9. The continuously variable transmission of claim 7 wherein said first one of said members of said first planetary gear comprises a ring gear and said first one of said members of said second planetary gear comprises a sun gear.

10. The continuously variable transmission of claim 9 wherein said second one of said members of said first planetary gear comprises a sun gear and said second one of said members of said second planetary gear comprises a ring gear.

11. The continuously variable transmission of claim 7 wherein said first one of said members of said first planetary gear comprises a ring gear and said first one of said members of said second planetary gear comprises a ring gear.

12. The continuously variable transmission of claim 11 wherein said second one of said members of said first planetary gear comprises a sun gear and said second one of said members of said second planetary gear comprises a sun gear.

13. The continuously variable transmission of claim 7 wherein said first one of said members of said first planetary gear comprises a sun gear and said first one of said members of said second planetary gear comprises a ring gear.

14. The continuously variable transmission of claim 13 wherein said second one of said members of said first planetary gear comprises a ring gear and said second one of said members of said second planetary gear comprises a sun gear.

15. An apparatus comprising:

first and second planetary gear sets, each of said first and second planetary gear sets including a sun gear member, a ring gear member, at least one planet gear meshing with said sun gear member and with said ring gear member, and a planet gear carrier member, said at least one planet gear being rotatably mounted to said planet gear carrier member;

a first drive for drivingly connecting a first one of said members of said first planetary gear set and a first one of said members of said second planetary gear set;

a second drive for drivingly connecting a second one of said members of said first planetary gear set and a second one of said members of said second planetary gear set;

a third drive drivingly connected with a third one of said members of said first planetary gear set;

a fourth drive drivingly connected with a third one of said members of said second planetary gear set;

a power input device associated with a first one of said drives;

a power output device associated with a second one of said drives; and at least one additional power device associated with a third one of said drives;

wherein said first drive comprises first and second gears, said first gear being drivingly connected with said first one of said members of said first planetary gear set, said second gear being drivingly connected with said first one of said members of said second planetary gear set;

wherein said second drive comprises third and fourth gears, said third gear being drivingly connected with said second one of said members of said first planetary gear set, said fourth gear being drivingly connected with said second one of said members of said second planetary gear set; and wherein said third gear is meshed with said fourth gear.

16. An apparatus comprising:

first and second planetary gear sets, each of said first and second planetary gear sets including a sun gear member, a ring gear member, at least one planet gear meshing with said sun gear member and with said ring gear member, and a planet gear carrier member, said at least one planet gear being rotatably mounted to said planet gear carrier member;

a first drive for drivingly connecting a first one of said members of said first planetary gear set and a first one of said members of said second planetary gear set;

a second drive for drivingly connecting a second one of said members of said first planetary gear set and a second one of said members of said second planetary gear set;

a third drive drivingly connected with a third one of said members of said first planetary gear set;

a fourth drive drivingly connected with a third one of said members of said second planetary gear set;

a power input device associated with a first one of said drives;

a power output device associated with a second one of said drives; and at least one additional power device associated with a third one of said drives;

wherein said first one of said members of said first planetary gear comprises a sun gear and said first one of said members of said second planetary gear comprises a sun gear, said second one of said members of said first planetary gear comprising a ring gear and said second one of said members of said second planetary gear comprising a ring gear.

17. An apparatus comprising:

first and second planetary gear sets, each of said first and second planetary gear sets including a sun gear member, a ring gear member, at least one planet gear meshing with said sun gear member and with said ring gear member, and a planet gear carrier member, said at least one planet gear being rotatably mounted to said planet gear carrier member;

a first drive for drivingly connecting a first one of said members of said first planetary gear set a d a first one of said members of said second planetary gear set; a second drive for drivingly connecting a second one of said members of said first planetary gear set and a second one of said members of said second planetary gear set;

a third drive drivingly connected with a third one of said members of said first planetary gear set;

a fourth drive drivingly connected with third one of said members of said second planetary gear set;

a power input device associated with a first one of said drives;

a power output device associated with a second one of said drives; and at least one additional power device as associated with a third one of said drives;

wherein said third one of said members of said first planetary gear comprises a planet gear carrier and said third one of said members of said second planetary gear comprises a planet gear carrier.

* * * * *